Nov. 1, 1966  C. J. HUNT  3,282,520
FILM TRANSPORT MECHANISM
Filed Oct. 5, 1964
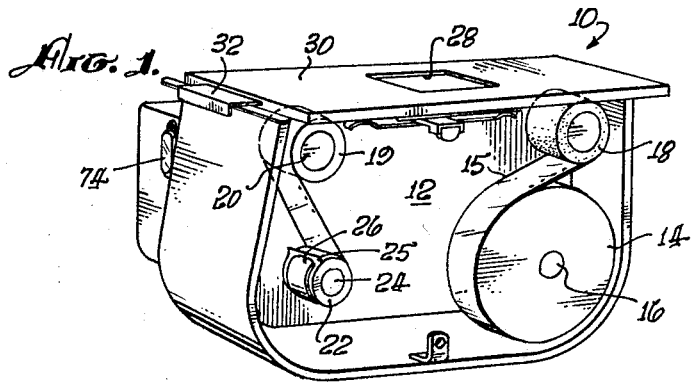
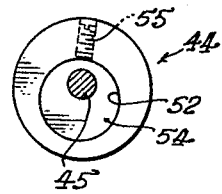
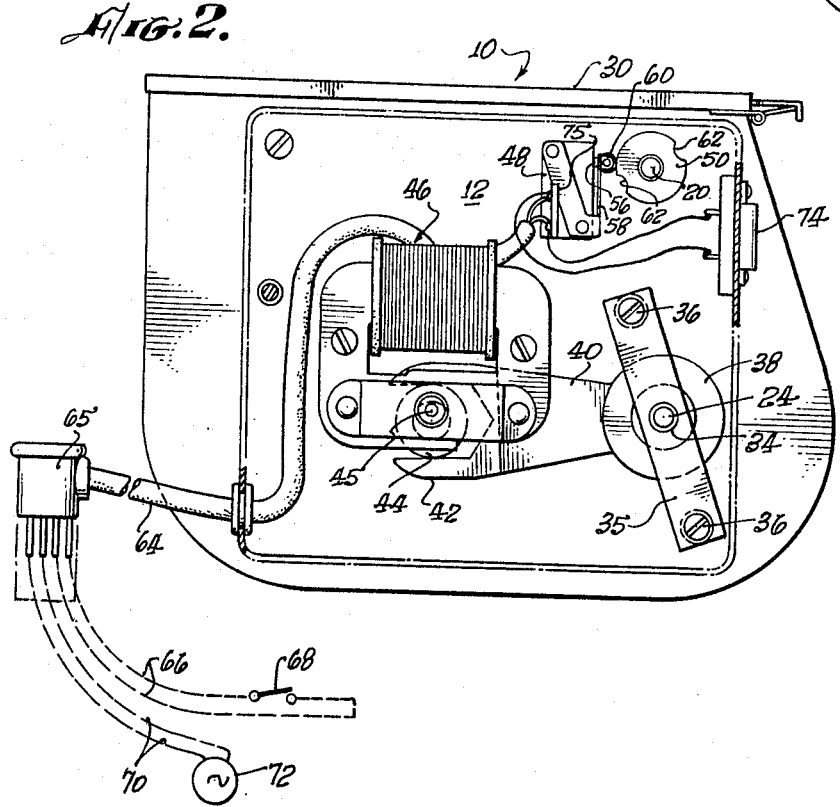
CHARLES J. HUNT,
INVENTOR.
By Jeo M Roberts
ATTORNEY.

United States Patent Office 3,282,520
Patented Nov. 1, 1966

3,282,520
FILM TRANSPORT MECHANISM
Charles J. Hunt, Orange, Calif., assignor to Beattie-Coleman, Inc., Anaheim, Calif., a corporation of California
Filed Oct. 5, 1964, Ser. No. 401,321
8 Claims. (Cl. 242—55.11)

This invention relates to a camera and, more particularly, relates to a mechanism for advancing film in a camera.

While the invention is widely applicable to cameras for its purpose, it has special utility for use in a so-called pulse camera wherein the film is advanced automatically to a new frame in response to a signal in the form of an electric pulse. The disclosure herein of such a pulse camera incorporating the invention will provide adequate guidance for those skilled in the art who may have occasion to depart from the specific structure of this example.

In the heretofore prevailing type of pulse camera, the film is advanced by a motor which typically is controlled by two normally closed switches connected in parallel. A first switch of the two switches is operated by a metering cam that is driven by the traveling film and that opens the switch to stop the film when the film advances by a given distance equal to the length of a frame plus a small spacing between frames. The second switch is controlled by the signal pulses and starts the film advance by closing long enough for the metering cam to close the first switch. The motor then remains energized until the advance of the film by the desired distance causes the metering cam to open the first switch.

A basic problem in the design of such a camera is to provide a mechanism by means of which the motor may advance the film rapidly from frame to frame and may abruptly stop the film when the film advance equals the length of a frame plus the usual small spacing between frames. In a conventional pulse camera, this problem is solved by using a motor operating, for example, at 2700 r.p.m. with a train of speed-reducing gears to actuate the take-up roll of the camera.

For most sizes of film, four gears are used for five reductions in speed between the motor and the take-up roll but if a relatively large film is used a fifth gear is necessary to provide adequate torque. Since such an extensive gear train has substantial mass and the mass of the film on the take-up roll may also be substantial, the mechanism tends to coast when the motor is deenergized. The extent to which the film tends to be advanced by coasting of the mechanism after the motor is deenergized is not constant because the velocity at which the film is driven varies with the changing diameter of the wound film on the take-up roll. For this reason the film cannot be stopped accurately by simply deenergizing the motor with a fixed allowable for coasting of the film.

A conventional pulse camera meets this situation by providing a brake to stop the film abruptly. In the usual arrangement an electromagnetic brake is automatically actuated in response to deenergization of the motor.

The broad object of the present invention is to simplify such a film advancing mechanism by reduction in the number of parts for the two-fold purpose of economy and increased reliability. The whole gear train is replaced by a one-way clutch that is oscillated by a motor-driven eccentric at a frequency of several cycles per second to advance the film by rapidly repeated small increments each of which increments is equal to only a small fraction of the distance that the film is advanced from frame to frame. In the preferred practice of the invention the increments of film advance are substantially less than the spacing between successive frames on the film.

If the eccentric is actuated by the same 2700 r.p.m. motor that is employed in a conventional camera, the eccentric oscillates the one-way clutch 2700 times per minute or 45 times per second and the increments by which the film is advanced 45 times per second is determined by three factors, namely, the throw of the eccentric, the effective length of the arm that is oscillated thereby, and the changing effective diameter of the wound film on the take-up roll. In one arrangement, for example, the throw or stroke of the eccentric is approximately 3/16 of an inch, the effective length of the oscillating arm is approximately 2¾ inches and the diameter of the wound film progressively increases from approximately 1⅛ inches when the take-up roll is initially nearly empty to approximately 3 inches when the take-up roll is nearly full.

With these dimensions the increments of film advance progressively increase from an initial minimum of approximately 0.04 inch to a final maximum of 0.10 inch when the take-up spool is nearly full. With the exposure frames on the film approximately 1¾ inch in length and with ¼ inch spacing between successive frames, the given distance by which the film is to be advanced between exposures is approximately 2 inches. In this example, approximately 50 strokes of the eccentric are required to advance the film 2 inches at the beginning of a roll of film and approximately 20 strokes are required to advance the film 2 inches near the end of the roll of film. Thus the magnitude of the increments increase from approximately two percent to approximately five percent of the desired total film advance.

With reference to the problem of abruptly stopping the film at the end of the given distance of travel of approximately 2 inches, it is to be noted that only the motor and the eccentric are in continuous motion and the rotating mass of these two is so low that the inertia of the mass is readily overcome by the involved friction including the usual friction provided at the supply roll to keep the film somewhat taut. Complete deceleration occurs in about one revolution of the motor or one cycle of the one-way clutch.

It is to be borne in mind that force is applied to the film only half of the time during the period when the film is being advanced from one frame to the next frame and that the film is decelerated if not actually stopped 45 times per second during the advance from frame to frame. When it is further considered that from 2½ to 6 increments occur in the final ¼ inch of film advance it becomes apparent that abruptness in stopping the film to avoid excessive spacing between frames is not a problem at all. In fact, often as not, the film is actually decelerated before the motor is deenergized and the film may even come to a stop before the motor is completely deenergized. Thus the invention not only eliminates the usual extensive gear train but also eliminates the need for any kind of a brake to stop the film.

The features and advantages of the invention may be understood from the following detailed description and the accompanying drawing.

In the drawing, which is to be regarded as merely illustrative:

FIG. 1 is a perspective view showing the film compartment of a film magazine that incorporates the presently preferred embodiment of the invention;

FIG. 2 is an elevational view of the mechanism that drives the film; and

FIG. 3 is an elevational view of the eccentric that is driven by the motor.

FIGS. 1 and 2 of the drawing show a film magazine, generally designated 10, adapted to be used as part of a pulse-operated camera. FIG. 1 shows how one side of the film magazine that is normally closed by a cover (not shown) forms a film compartment and FIG. 2 shows how the other side of the magazine which is also normally closed by a cover (not shown) provides a compartment for the mechanism that advances the film, the two compartments being separated by a common wall 12.

In FIG. 1, the film compartment contains a spool 14 of film 15 rotatably mounted on a spindle 16 and in a well known manner the spindle 16 rotates with sufficient frictional resistance to maintain the film under slight tension. The film 15 passes around the cork surface of an idler roll 18 and then around the cork surface of a metering roll 19 on a shaft 20 to reach a rotary take-up means in the form of a core 22 that is keyed to a take-up shaft 24. As shown in the drawing, the leading end 25 of the film 15 may be releasably secured to the core 22 by means of a spring clip 26.

Between the idler roll 18 and the metering roll 19, the film passes under a rectangular aperture 28 in a flat wall 30 of the film magazine where a frame of the film is exposed to light from the lens of the camera. When the film magazine is separated from the camera a dark slide 32 is interposed between the film and the rectangular aperture 28. When the film magazine is in use on a camera, the dark slide 32 is withdrawn and the usual pressure plate (not shown) holds the film snugly against the rim of the rectangular aperture 28.

FIG. 2 shows how the second reduced end of the take-up shaft 24 is journaled in a bearing 34 in a support bar 35 that is attached by screws 36 to a pair of support posts (not shown) on the dividing wall 12 between the two compartments. The mechanism shown in FIG. 2 for periodically rotating the take-up shaft 24 by small increments include: a one-way clutch 38 on the take-up shaft 24; an arm 40 extending rigidly from the one-way clutch and forked to provide two fingers 42; an orbitally moving eccentric 44 on a drive shaft 45 of a motor 46, the eccentric being straddled by the fingers 42 to oscillate the one-way clutch 38; a first switch in the form of a microswitch 48 in the control circuit for the motor 46; and a metering cam 50 on the shaft 20 of the metering roll 19 to control the microswitch.

The one-way clutch 38 is of a well known type and may be constructed, for example, as disclosed in the Fahlberg Patent 3,054,489. The one-way clutch operatively engages the take-up shaft 24 when the one-way clutch rotates counterclockwise as viewed in FIG. 2, the take-up shaft being disengaged when the clutch rotates in the opposite direction. Preferably the eccentric 44 is adjustable with respect to its eccentricity for adjustment of the throw of the arm 40. For this purpose the ececntric 44 may be of the construction shown in FIG. 3.

In FIG. 3 the body of the eccentric 44, which may be circular, has a circular opening 52 in which an inner circular body 54 fits snugly for rotational adjustment. The circular opening 52 is located eccentrically of the main body of the eccentric 44 and the inner circular body 54 is mounted eccentrically on the motor shaft 45. Thus rotational adjustment of the inner circular body 54 in the circular opening 52 changes the position of the eccentric 44 as a whole with respect to the motor shaft 45. It is contemplated that the rotational position of the inner circular body 54 will be adjusted at the factory and will be permanently secured, for example, by means of suitable setscrew means 55.

The microswitch 48 is biased to open and has an operating button 56 controlled by an outwardly biased leaf spring arm 58. The leaf spring arm 58 carries a small roller 60 which normally seats in one of the two peripheral recesses 62 of the metering cam 50. Thus the microswitch 48 is open when the roller 60 is in a recess 62 as shown in FIG. 2 and is closed by rotation of the metering cam.

The control circuit for the motor 46 includes a four wire cable 64 carrying a well-known type of fitting 65 for connection to external wiring. As indicated diagrammatically by dotted lines 66, the external wiring connects the cable to a second remote control switch 68 and as indicated by dotted lines 70, the external wiring also connects the motor circuit to a suitable source 72 of electric current. In the preferred practice of the invention, an indicating lamp 74 on the exterior of the film magazine is energized whenever the motor 46 is energized. The wires of cable 64, motor 46, microswitch 48 and indicating lamp 74 may be interconnected at a terminal bracket 75 that is conveniently mounted on the microswitch 48.

The manner in which the descirbed mechanism functions for its purpose may be readily understood from the foregoing description. Normally the motor 46 is de-energized, both the microswitch 48 and the remote control switch 68 being open. When the remote switch 68 is momentarily closed, a pulse of current is delivered to the motor 46 of sufficient time duration to permit the motor to advance the film sufficiently for the metering cam 50 to close the microswitch 48. The remote switch 68 then opens to place the motor under the sole control of the microswitch 48.

The motor 46 drives the eccentric 44 at approximately 45 revolutions per second to advance the film intermittently by small increments but the increments occur at such frequency that the film actually appears to travel continuously. When sufficient film is advanced to bring the next peripheral recess 62 of the metering cam 50 into register with the small roller 60, the microswitch 48 opens to deenergize the motor. The motor stops substantially instantly largely because the inertia of the eccentric 44 is small relative to the frictional resistance to its rotation. It is to be noted that the inertia of the one-way clutch 38 and the arm 40 have no tendency to cause the motor to coast since they do not act reversibly on the eccentric 44.

It is apparent that the invention achieves exceptional simplicity in the working parts of the film transport mechanism since it eliminates the whole gear train of the prior art and in addition eliminates the usual brake of the prior art. The simplification of the mechanism not only reduces cost but makes the mechanism more reliable and much easier to maintain in efficient working condition.

It has been found that considerable latitude is permitted in the rate of rotation of the motor 46 and in the magnitude of the increments of film advance. In most instances the speed of the motor will be at least 1500 r.p.m. to result in at least 25 increments of film advance per second but a motor speed on the order of 2700 r.p.m. is preferred.

My description in specific detail of the selected embodiment of the invention will suggest various changes, substitutions and other departures from my disclosure within the spirit and scope of the appended claims.

I claim:

1. A method of advancing a film in the focal plane of a camera to produce a series of frames of a given dimension longitudinally of the film with a small spacing between frames, comprising:

oscillating a one-way rotary clutch continuously several times a second through a range of small magnitude with the clutch connected to the take-up roll of the camera to advance the film by increments equal to a small fraction of said given dimension with the increments progressively increasing with increasing diameter of the wound film on the take-up roll and with the maximum increments less than said spacing; and terminating the continuous oscillation of the one-way clutch when the total of the progressively increasing increments equals the given dimension plus the spacing.

2. A method of actuating a take-up roll in a pulse camera to advance a film a given distance equal to the length of a frame plus a small spacing between frames, comprising:

in response to a signal pulse, initiating continuous oscillation of a one-way clutch several times a second through a range of small magnitude to advance the film by rapidly repeated increments that are equal to small fractions of the given distance and are substantially less than said spacing;

measuring the advance of the film by the accumulating increments; and terminating the oscillation of the one-way clutch when the advance of the film equals the given distance.

3. In a camera for exposing successive frames on a film wherein the film is drawn from a supply roll by a rotary take-up means, a mechanism for periodically advancing the film by a given distance equal to the length of a frame plus a desired spacing between frames, comprising:

a motor;
a circuit to energize the motor;
a one-way clutch operatively connected to the rotary take-up means;
an orbitally moving member driven by the motor and operatively connected to the one-way clutch to oscillate the one-way clutch at a vibratory rate to cause the take-up means to intermittently advance the film by increments equal to a small fraction of the given distance;
a rotary metering cam operated by the film;
a first normally open switch in said circuit controlled by the metering cam to close in response to initial rotation of the metering cam out of a starting position and to open when the film advances the given distance; and
a second normally open switch in parallel with the first switch to close long enough for the metering cam to close the first switch.

4. A combination as set forth in claim 3 in which the spacing between frames is a small fraction of the length of a frame and in which said increments of film advance are less than said spacing.

5. A combination as set forth in claim 3 in which the speed of the motor is at least 1500 r.p.m. to advance the film at least 25 increments per second.

6. In a camera for exposing successive frames on a film wherein the film is drawn from a supply roll by being wound onto a rotary take-up means, a mechanism for periodically advancing the film by a given distance equal to the length of a frame plus a desired spacing between frames, comprising:

a one-way clutch operatively connected to the take-up means;
alternating means movable between two alternate positions and operatively connected to the one-way clutch for oscillation thereof to rotate the take-up means cyclically by increments of small magnitude to advance the film by small fractions of said distance with the increments progressively increasing to a maximum as the diameter of the wound film on the take-up means increases to a maximum, the maximum increment being less than said spacing,
said supply roll being frictionally retarded to decelerate the rotary take-up means after each oscillation of the one-way clutch;
power means to actuate the alternating means several times per second;
means to sense advance of the film by the given distance; and
means responsive to the sensing means to deenergize the power means.

7. In a camera for exposing successive frames on a film wherein the film is drawn from a supply roll by a rotary take-up means, a mechanism for periodically advancing the film by a given distance equal to the length of a frame plus a desired spacing between frames, comprising:

a motor;
a circuit to energize the motor;
means including an eccentric movable in an orbit and driven by the motor;
a one-way clutch positioned concentrically of the take-up means and operatively connected thereto;
means extending from the one-way clutch and straddling the eccentric to cause the eccentric to oscillate the one-way clutch at a vibratory rate to advance the film intermittently by increments equal to small fractions of the given distance; and
means responsive to travel of the film to deenergize the motor when the film advances the given distance.

8. A method of advancing a film in the focal plane of a camera to produce a series of frames of a given dimension measured longitudinally of the film with a small spacing between frames, comprising:

routing the film from a film supply to the focal plane and from the focal plane to a rotary take-up means for winding up the exposed film with increasing diameter of the wound film;
oscillating a one-way rotary clutch continuously several times a second through a range of small magnitude with the clutch connected to the rotary take-up means to advance the film by increments with the increments progressively increasing to a maximum as the diameter of the wound film progressively increases to a maximum,
said increments being a small fraction of said given dimension and substantially less than said spacing;
yieldingly resisting the travel of the tape to the focal plane to yieldingly resist rotation of the rotary take-up means to decelerate the take-up means after each oscillation of the one-way clutch; and
terminating the continuous oscillation of the one-way clutch when the total of the progressively increasing increments equal said given dimension plus said spacing.

References Cited by the Examiner
UNITED STATES PATENTS

| | | | |
|---|---|---|---|
| 2,194,158 | 3/1940 | Adams | 352—175 |
| 2,827,245 | 3/1958 | Kleinschmidt et al. | 242—55 |
| 3,027,800 | 4/1962 | Leuschke et al. | 352—175 |

References Cited by the Applicant
UNITED STATES PATENTS

| | | |
|---|---|---|
| 1,480,044 | 1/1924 | Bowers et al. |
| 2,229,283 | 1/1941 | Fischer. |
| 2,357,557 | 9/1944 | Sherman et al. |
| 2,380,034 | 7/1945 | Doyle. |
| 2,914,268 | 11/1959 | Tafel et al. |
| 2,970,489 | 2/1961 | Eason. |

FRANK J. COHEN, *Primary Examiner.*

LEONARD D. CHRISTIAN, *Examiner.*